United States Patent [19]

Moore et al.

[11] Patent Number: 4,714,316
[45] Date of Patent: Dec. 22, 1987

[54] OPTICAL FIBER UNIT HAVING PROTECTIVE ASSEMBLY

[75] Inventors: Wayne E. Moore, Holliston; Stephen R. Quinn, Medfield; Wesley M. Tufts, Holliston; William F. Gasko, Berlin, all of Mass.

[73] Assignee: Aster Associates, Milford, Mass.

[21] Appl. No.: 767,492

[22] Filed: Aug. 20, 1985

[51] Int. Cl.[4] ................................................ G02B 6/26
[52] U.S. Cl. ............................. 350/96.20; 350/96.15; 350/96.23
[58] Field of Search ............... 350/96.15, 96.16, 96.20, 350/96.21, 96.22, 96.23

[56] References Cited

U.S. PATENT DOCUMENTS

| 4,087,156 | 5/1978 | Kao et al. | 350/96.21 |
|---|---|---|---|
| 4,254,865 | 3/1981 | Pacey et al. | 206/316 |
| 4,264,126 | 4/1981 | Sheem | 350/96.15 |
| 4,474,431 | 10/1984 | Bricheno | 350/96.15 |
| 4,493,528 | 1/1985 | Shaw et al. | 350/96.15 |
| 4,504,112 | 3/1985 | Gould et al. | 350/96.23 |

FOREIGN PATENT DOCUMENTS 0104416 4/1984 European Pat. Off. .
2065915 7/1981 United Kingdom .

OTHER PUBLICATIONS

Phalo/O.S.D. Techspex, Optical Directional Coupler (ODC).
Canstar Communications, Singlemode Fiber Optic Couplers.
Allied Amphenol Products, Amphenol Interfuse Single Mode Fiber Optic Coupler.
Gould Electronics, Gould Singlemode Fiber Optic Components.

Primary Examiner—Eugene R. LaRoche
Assistant Examiner—James C. Lee

[57] ABSTRACT

An optical fiber unit consists of one or more optical fibers configured to provide an optical function, a preformed internal protective body having a preformed space into which the fiber(s) extend with a relatively close fit, the internal protective body being of a material of hardness and coefficient of thermal expansion substantially matched to that of the fiber(s) and the fiber(s) being bonded thereto, an outer protective body surrounding the internal protective body, at least a portion of the outer protective body having a preformed recess shaped to receive and support the rigid internal protective body, a mass of relatively soft uniting material disposed in a manner to secure the internal protective body to the preformed portion of the outer protective body, an injection-molded portion of the outer protective body, of substance less brittle than the internal protective body, effectively surrounding and protecting the internal protective body and the fiber(s) therewithin from the environment in which the unit is intended for use, and stress relief means associated with the outer protective body enabling the fiber(s) to extend from the internal protective body through the outer protective body in a manner that is effective to prevent breakage of the fibers under conditions of stress on the fiber(s).

16 Claims, 13 Drawing Figures

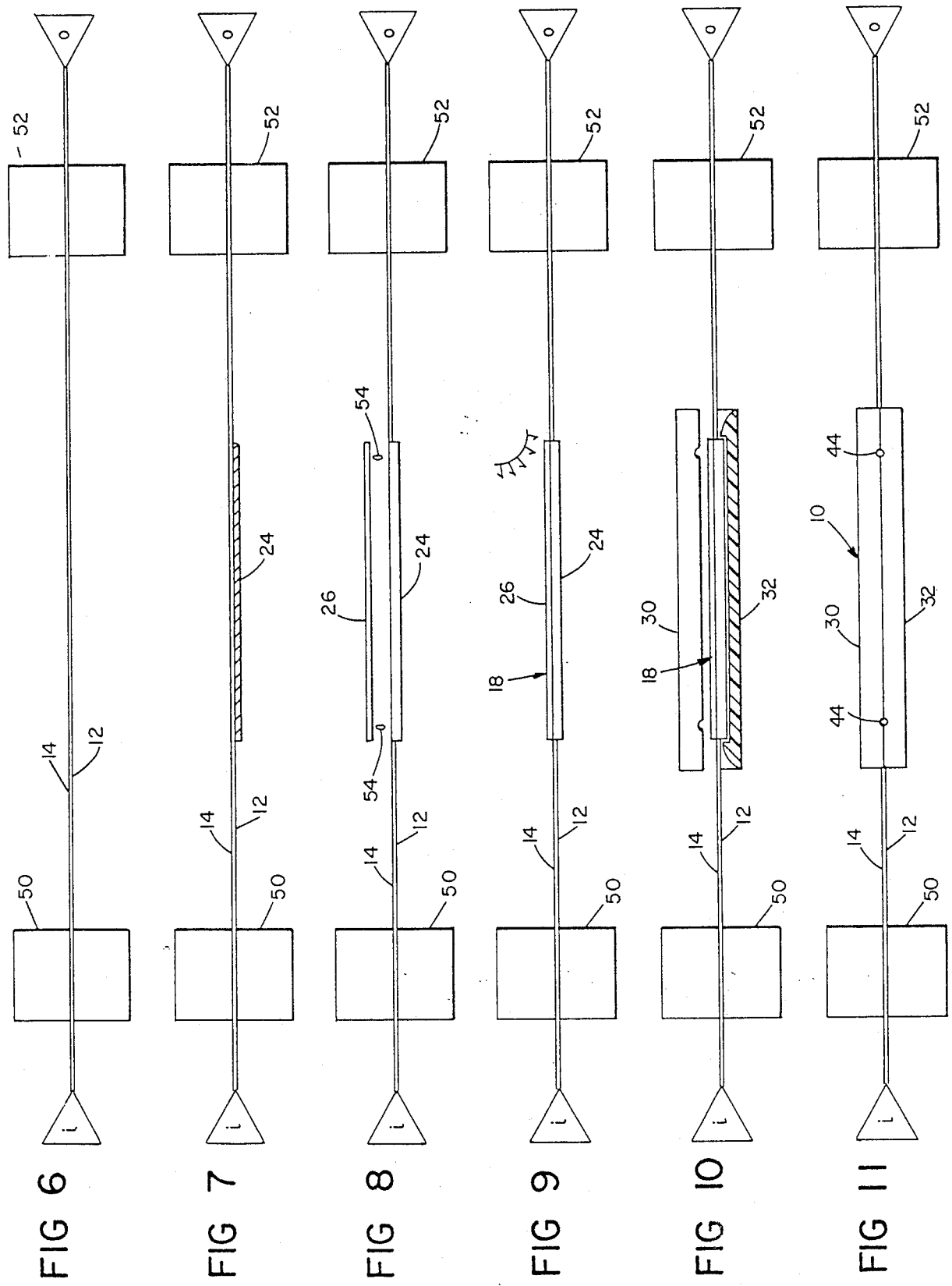

OPTICAL FIBER UNIT HAVING PROTECTIVE ASSEMBLY

BACKGROUND OF THE INVENTION

The invention concerns fiber optic units, for example fiber optic couplers and multiplexers. For these and similar fiber optic units, the delicate nature of the fiber optic components makes them susceptible to damage in environments where their use is desired. Examples of the many environmental conditions that may affect the units are high hydrostatic pressure, substantial shock or vibration, high or low temperature, wide temperature variation, high humidity, corrosive environment, etc. It is desirable to find an inexpensive way to make fiber optic units in a form suitable for the particular conditions of the desired use and still achieve small exterior dimensions. It is likewise desirable to find a way to provide protective packaging of the unit in a manner that facilitates the handling of the components and permits their automated manufacture and assembly.

SUMMARY OF THE INVENTION

An optical fiber unit according to the invention comprises an optical fiber means configured to provide an optical function, a preformed rigid internal protective body having a preformed space into which the optical fiber means extends with a relatively close fit, the internal protective body being of a material of hardness and coefficient of thermal expansion substantially matched to that of the fiber means and the fiber means being bonded thereto, an outer protective body surrounding the internal protective body, at least a portion of the outer protective body having a preformed recess shaped to receive and support the rigid internal protective body, the internal body seated in the recess, a mass of relatively soft uniting material disposed in a manner to secure the internal protective body to the performed portion of the outer protective body, an injection-molded portion of the outer protective body of substance less brittle than the internal protective body effectively surrounding and protecting the internal protective body and the fibers therewithin from the environment in which the unit is intended for use, and stress relief means associated with the outer protective body enabling the fiber means to extend from the internal protective body through the outer protective body in a manner that is effective to prevent breakage of the fiber means under conditions of stress on the fiber means.

In preferred embodiments, the dimensions of the unit transverse to the axis of the associated fibers is of the order of about 0.05 inch or less; the stress relief means comprises an outlet surface defined by an the end of the outer protective body and disposed about, and along the length of, an optical fiber emerging from the internal protective body, the surface lying closely about the fiber adjacent the internal body and curving outwardly along the length of the fiber with a radius of curvature greater than the breaking radius of the fiber, preferably the surface is formed by injection molding; the outer protective body comprises two or more elongated segments preformed by injection molding, the segments defining the preformed, elongated recess sized for receiving the internal protective body, and the segments being adapted for assembly about the internal protective body while the associated optical fiber means is being held in the fixture used in fabricating the optical fiber means, preferably portions of the relatively soft uniting material are disposed within the preformed recess, at the ends of the internal body, joining the ends with associated portions of the recess-defining outer protective body, a portion of the internal protective body extending between the portions of the uniting material, within the recess, being free of force-transmitting contact with the recess-defining surfaces of the outer protective body, and the dimension of the unit transverse to the axis of the associated fiber means is of the order of about 0.05 inch; the associated fiber means is of the form of a fiber optic coupler; the outer protective body is color-coded for indicating characteristics of the associated optical fiber means; the outer-protective body comprises a preformed member having a generally H-shape cross-section of two upright arms and a cross member therebetween, together defining the preformed recess for receiving and supporting the rigid inner protective body, and the uniting material is an injection molded mass formed about the H-shape preformed member and the internal protective body; and the internal protective body is cylindrical.

According to another aspect of the invention, a method of forming an optical fiber unit comprises the steps of: providing an optical fiber means configured to provide an optical function, placing about the optical fiber means a preformed internal protective body of material of hardness and thermal expansion substantially matched to that of the fibers, the internal protective body having a preformed space through which the fiber means extends with a relatively close fit, bonding the optical fiber means to the internal protective body, assembling about the internal protective body and optical fiber means an outer protective body comprising two preformed injection-molded segments of substance less brittle than the internal protective body, the segments defining a preformed recess to receive and support the rigid internal protective body, bonding the segments of the outer protective body about the internal protective body and optical fiber means, and injecting a mass of relatively soft uniting material into the recess in a manner to join spaced-apart portions of the internal protective body to associated portions of the recess-defining outer protective body, a portion of the internal protective body extending within the recess, between masses of uniting material, the portion being free of force-transmitting contact with surrounding recess-defining surfaces of the outer protective body.

In a preferred embodiment of this aspect of the invention, the optical fiber means comprises optical fiber portions extending in opposite directions from a region configured to provide the optical function; wherein the optical fiber portions are gripped by tooling during the making of the optical fiber means, and the portions are continued to be held for support by the tooling during the remainder of the steps described above, preferably the optical fiber means is a coupler and the tooling is used during the steps of heating and drawing the fibers to form the coupler; and the method comprises the further step of monitoring the optical function of the associated optical fibers during formation of the optical fiber unit.

These and other features and advantages of the invention will be understood from the following description of a presently preferred embodiment of the invention, and from the claims.

PREFERRED EMBODIMENTS

We first briefly describe the drawings.

FIGS. 6 through 11 are somewhat diagrammatic representations of the sequence of assembly for an optical fiber unit according to the invention; and FIG. 12 is a side sectional view of an alternate embodiment of the invention, while

DETAILS OF PREFERRED EMBODIMENTS

Figure 1:
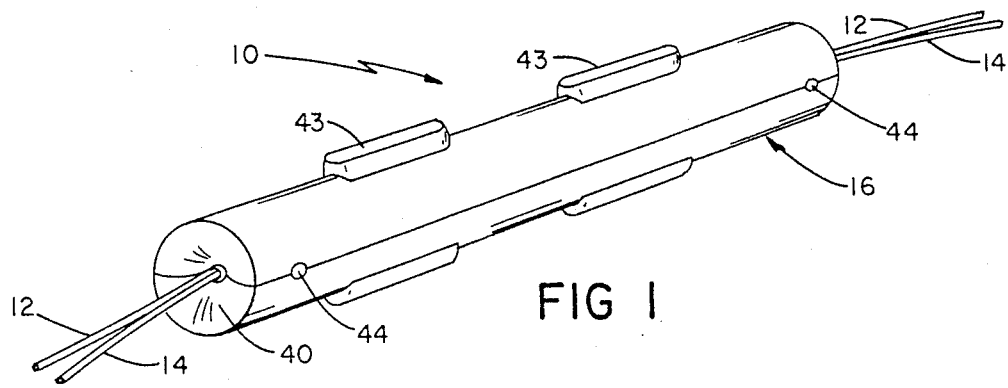
FIG. 1 is a perspective view of one embodiment of an optical fiber unit.
Figure 3:
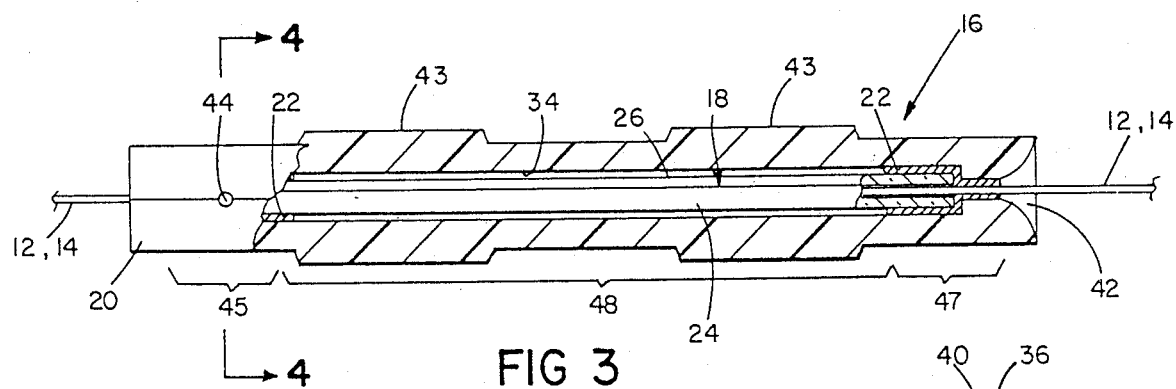
FIG. 3 is a side view partially in section of the unit of FIG. 1.
Figure 4:
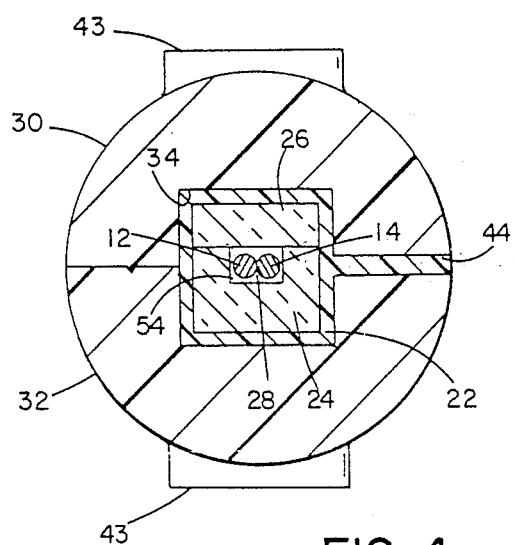
FIG. 4 is a much enlarged end sectional view taken at 3—3 of FIG. 2.
Figure 5:
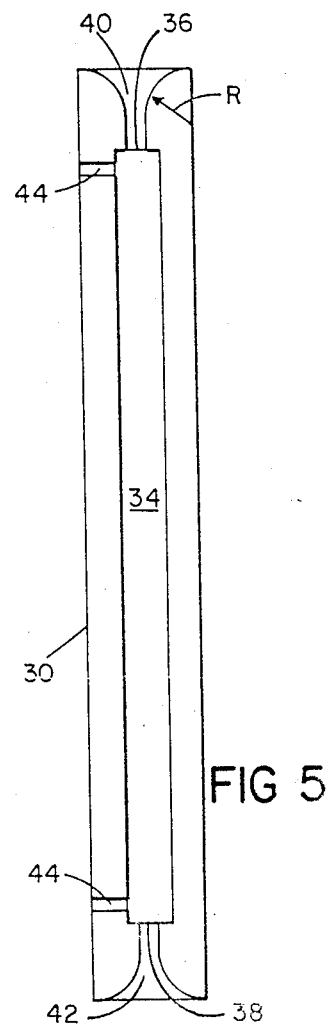
FIG. 5 is a plan view of one segment of the outer protective body of the unit.
Figure 2:
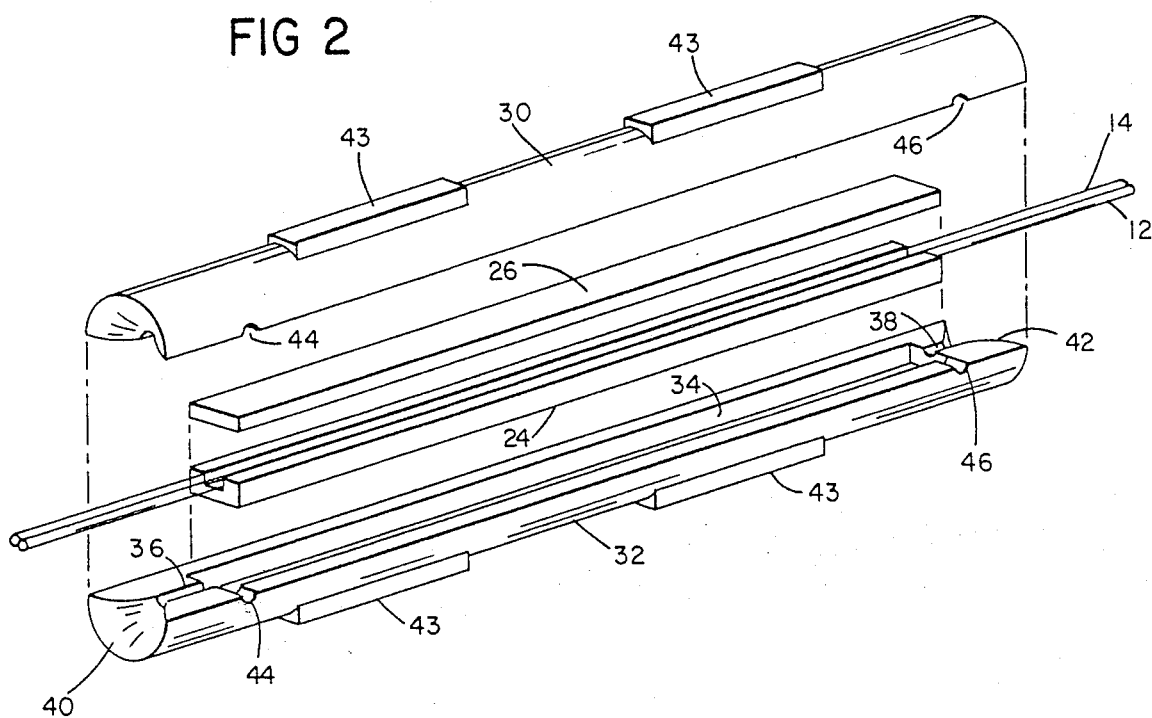
FIG. 2 is an exploded view in perspective of the unit.

Referring to FIGS. 1-5, an optical fiber unit 10 consists of associated quartz optical fibers 12, 14 and a protective package 16 assembled about the fibers in the area of their association. For the purpose of this description, two fibers are fused to form an optical coupler.

The protective package 16 assembled about the fibers consists of an internal protective body 18, an outer protective body 20 and an intervening mass of relatively soft uniting material 22.

The internal protective body 18, about 0.05 inch X 0.05 inch and 1.0 inch long, is formed of a material selected for characteristics of hardness and coefficient of thermal expansion substantially matched to that of the fibers to avoid unbalanced stresses during use. Use of the same material as the fibers, i.e. quartz, is preferred. This internal protective body 18 includes a lower segment, or receiver, 24 and an upper segment, or cover, 26. The lower segment 24 defines a preformed channel 26 sized to receive the fibers in relatively close fit, e.g. for fibers 0.009 inch diameter, channel 28 is 0.021 inch wide and 0.013 inch deep. The fibers, disposed in this channel, are bonded to the body segment 24 using an adhesive selected for hardness and minimum thermal expansion, e.g. UV curable epoxy, and the cover 26 is secured in place.

The outer protective body 20, about 0.145 inch diameter by 1.2 inch long, comprises two opposed segments 30, 32 formed by injection molding. These segments are of a substance less brittle than the internal protective body, e.g. they are made of glass-filled nylon, having a Young's Modulus of about $10^6$ psi, for toughness. They are color-coded to indicate the optical characteristics of the associated fibers, e.g. a package having black and red outer segments may indicate a 20/80, 850 nanometer coupler. The outer protective body defines a recess 34 sized to receive and support the internal protective body with a clearance of about 0.005 to 0.010 inch on all sides, the optical fibers extending out of the outer body via ports 36, 38. To provide stress relief for the fibers, the outlet surfaces 40, 42 defined by the outer protective body along the length of the fibers are constructed to closely surround the fibers as they emerge from the internal protective body, then curve outwardly away from the fibers on radius, R, selected to be greater than the radius at which the fiber will break, e.g. about 3/16 inch. Fiber optic unit mounting pads 43 are also provided on the external surface of the outer body.

The outer protective body segments are assembled about the internal protective body and bonded together, e.g. with adhesive or by ultrasonic welding. A relatively soft material, e.g. 3110 RTV silicone elastomer polymer (sold by Dow Corning of Midland, Mich.), is injected via ports 44, 46 to fill segments 45, 47 of the unoccupied space of recess 34, each about 10% of the total length of the recess. The material in segments 45 and 47 surrounds the optical fibers and the internal protective body, fills the gap between the internal and outer protective body and seals the ends of the protective package. This material provides a degree of isolation from shock or rough handling. (A limited degree of outward leakage of resin material may occur via ports 36, 38 (about 0.020 inch diameter), around the fibers, with the beneficial effect of providing additional stress relief.) The middle segment 48 of recess 34 (about 80% of its length) surrounding the center portion of the internal protective body does not fill with resin, thus leaving an air gap that prevents force-transmitting contact between the internal body and recess-defining walls of the outer body in the center of the package where maximum deflection of the unit would occur under force exerted from the outside. After injection, the silicone resin is cured to complete the unit.

Referring to FIGS. 6 through 11, the sequence of assembling the optical fiber unit of the invention will be described.

In FIG. 6, optical fibers 12, 14 for forming an optical element, e.g. in this case, an optical coupler, are aligned and mounted in blocks 50, 52, heated, then drawn and fused, with the ends of the coupler connected to a monitoring device, represented by "i" (input) and "o" (output), for monitoring the optical performance of the mounted coupler. Monitoring may be continued through all stages of the assembly sequence, with the optical fibers remaining mounted in blocks 50, 52, to detect any detrimental changes in performance due, e.g. to mishandling during application of the protective bodies.

In FIG. 7, the lower piece 24 of the internal protective body is positioned with the optical fibers closely contained within the channel 28. Adhesive 54, in a volume predetermined to provide adequate bonding, e.g. a few thousandth of an inch, without excess that could detrimentally affect temperature performance, is added (FIG. 8) and the internal protective body cover 26 put into place. The adhesive is cured, as by U.V. light transmitted through the transparent cover (FIG. 9). The segments 30, 32 of the outer protective body 20 are then assembled about the internal protective body 18 and bonded together. Measured amounts of the relatively soft uniting material are injected into the ends of the recess via ports 45, 46 to flow about ends of the internal body and the optical fibers. As explained above, the central portion of the recess is left empty to avoid force-transmitting contact between the opposed surfaces of the recess and internal body. The uniting resin masses are then cured.

The protective package 10 formed by high speed production methods, and resistant to chemicals, pressure, point loading, and temperature is thus unitized about the optical fiber coupler to securely maintain the relationship of the fibers. The unit is dismounted from blocks 50, 52 and is ready for use in a miniaturized optical circuit, e.g., in sonar devices used at depths having pressures of 2,500 to 5,000 psi, in oil well sensors, subject to caustic environment and temperatures to 300° C., or in gyroscopes subject to sharp acceleration.

OTHER EMBODIMENTS

Figure 12:
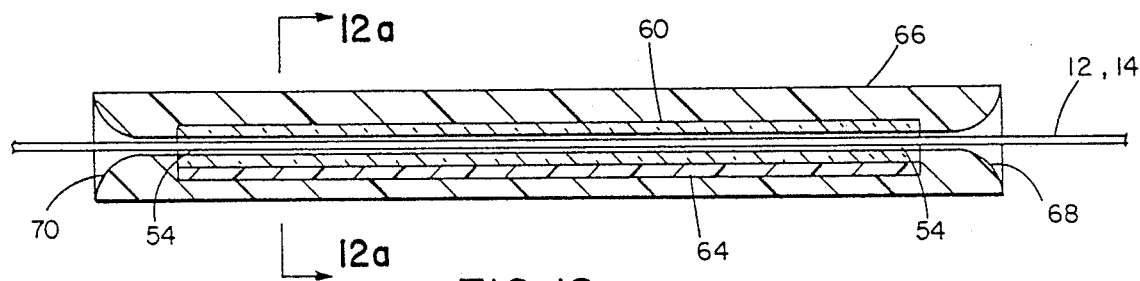
Figure 12A:
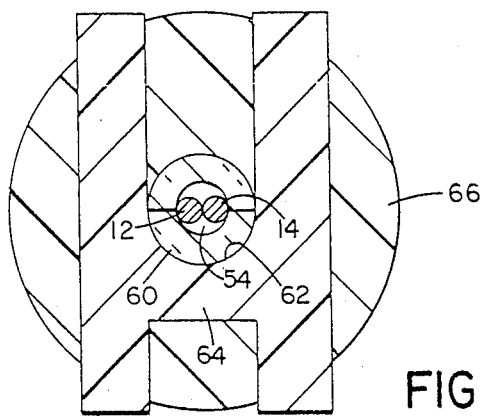
FIG. 12a is an end sectional view taken at 12—12a of FIG. 12.

Other embodiments are within the following claims. For example, referring to FIGS. 12 and 12a, optical fibers 12, 14, forming an optical coupler, are placed in a channel of a cylindrical internal protective body 60 formed from a split tube. The cylindrical internal body is placed in a similar shaped recess 62 of an H-shape, molded portion 64 of the outer protective body 64 (which may be color-coded). This outer protective body portion supporting the internal protective body and optical fibers is placed in a mold cavity, and the cavity is injected with resin which serves to unite the internal protective body and the H-shaped outer protective body portion, the injected material forming a generally cylindrical outer protective body portion 66, with stress relieving surfaces 68, 70 about the optical fibers at each end.

The internal protective body may be cylindrical for increased crush resistance as shown, or it may be rectangular or of other shape, as desired. The dimensions are provided only by way of example, and can be varied, particularly as to length. Other materials may be employed, e.g. when exposed to active solvents, a different resin may be used as the uniting mass. The protective package may be used for other optical devices and may be used with multiple devices.

What is claimed is:

1. An optical fiber unit comprising:
    an optical fiber means configured to provide an optical function,
    a performed rigid, hollow internal protective body having a preformed space of limited length into which said optical fiber means extends with a relatively close fit,
        said internal protective body being of a material of hardness and coefficient of thermal expansion substantially matched to that of said fiber means and said fiber means being bonded thereto,
    an outer protective body surrounding said internal protective body, at least a portion of said outer protective body being injection-molded, said body having a performed recess shaped to receive and support said rigid internal protective body, said internal body seated in said recess,
    a mass of relatively soft uniting material disposed in a manner to secure said internal protective body to said performed portion of said outer protective body,
        said injection-molded portion of said outer protective body, being of substance less rigid and brittle than said internal protective body, effectively surrounding and protecting said internal protective body and the fibers therewithin from the environment in which the unit is intended for use, and
    stress relief means associated with said outer protective body through the outer protective body in a manner that is effective to prevent breakage of said fiber means under conditions of stress on said fiber means.

2. An optical fiber unit comprising
    an optical fiber means configured to provide an optical function,
    a preformed rigid internal protective body having a performed space into which said optical fiber means extends with a relatively close fit,
        said internal protective body being of a material of hardness and coefficient of thermal expansion substantially matched to that of said fiber means and said fiber means being bonded thereto,
    an outer protective body surrounding said internal protective body, at least a portion of said outer protective body having a preformed recess shaped to receive and support said rigid internal protective body, said internal body seated in said recess.
    a mass of relatively soft uniting material disposed in a manner to secure said internal protective body to said preformed portion of said outer protective body,
        an injection-molded portion of said outer protective body, of substance less brittle than said internal protective body, effectively surrounding and protecting said internal protective body and the fibers therewithin from the environment in which the unit is intended for use, and
    stress relief means associated with said outer protective body enabling the fiber means to extend from said internal protective body through the outer protective body in a manner that is effective to prevent breakage of said fiber means under conditions of stress on said fiber means,
        said stress relief means comprising an outer surface defined by portion of said outer protective body and disposed about, and along the length of, an optical fiber emerging from said internal protective body, said surface lying closely about said fiber adjacent said internal body and curving outwardly along the length of the fiber with a radius of curvature greater than the breaking radius of said fiber.

3. The optical fiber unit of claim 1 or 2 wherein the dimensions of said unit transverse to the axis of said associated fibers is of the order of about 0.05 inch or less.

4. The optical fiber unit of claim 1 or 2 wherein said outer protective body comprises two or more elongated segments preformed by injection molding, said segments defining said preformed, elongated recess sized for receiving said internal protective body, and said segments being adapted for assembly about said internal protective body while associated optical fiber meabs is being held in the fixture used in fabricating said optical fiber means.

5. The optical fiber unit of claim 1 or 2 wherein said associated fiber means is of the form of a fiber optic coupler.

6. The optical fiber unit of claim 1 or 2 wherein the outer protective body is color-coded for indicating characteristics of the associated optical fiber means.

7. The optical fiber unit of claim 1 wherein said internal protective body is cylindrical.

8. The optical fiber unit of claim 2 wherein said surface is formed by injection molding.

9. The optical fiber unit of claim 4 wherein the dimension of the unit transverse to the axis of the associated fiber means is of the order of about 0.05 inch.

10. An optical fiber unit comprising
    an optical fiber means configured to provide an optical function, a preformed rigid internal protective body having a preformed space into which said optical fiber means extends with a relatively close fit, said internal protective body being of a material of hardness and coefficient of thermal expansion substantially matched to that of said fiber means and said fiber means being bonded thereto, an outer protective body surrounding said internal protective body, at least a portion of said outer protective body having a preformed recess shaped to receive and support said rigid internal protective body, said internal body seated in said recess, a mass of relatively soft uniting material disposed in a manner to secure said internal protective body to said preformed portion of said outer protective body, an injection-molded portion of said outer protective body, of substance less brittle than said internal protective body, effectively surrounding and protecting said internal protective body and the fibers therewithin from the environment in which the unit is intended for use, and stress relief means associated with said outer protective body enabling the fiber means to extend from said internal protective body through the outer protective body in a manner that is effective to prevent breakage of said fiber means under conditions of stress on said fiber means, said outer protective body comprising two or more elongated segments preformed by injection molding, said segments defining said preformed, elongated recess sized for receiving said internal protective body, said segments being adapted for assembly about said internal protective body while associated optical fiber means is being held in the fixture used in fabricating said optical fiber means, portions of said relatively soft uniting material being disposed within said preformed recess, at the ends of the internal body, joining said ends with associated portions of the recess-defining outer protective body, a portion of said internal protective body extending between said portions of said uniting material, within said recess, being free of force-transmitting contact with the recess-defining surfaces of said outer protective body.

11. The optical fiber unit of claim 10 wherein the dimension of the unit transverse to the axis of the associated fiber means is of the order of about 0.05 inch.

12. An optical fiber unit comprising
an optical fiber means configured to provide an optical function, a preformed rigid internal protective body having a preformed space into which said optical fiber means extends with a relatively close fit, said internal protective body being of a material of hardness and coefficient of thermal expansion substantially matched to that of said fiber means and said fiber means being bonded thereto, an outer protective body surrounding said internal protective body, at least a portion of said outer protective body having a preformed recess shaped to receive and support said rigid internal protective body, said internal body seated in said recess, a mass of relatively soft uniting material disposed in a manner to secure said internal protective body to said preformed portion of said outer protective body, an injection-molded portion of said outer protective body, of substance less brittle than said internal protective body, effectively surrounding and protecting said internal protective body and the fibers therewithin from the environment in which the unit is intended for use, and stress relief means associated with said outer protective body enabling the fiber means to extend from said internal protective body through the outer protective body in a manner that is effective to prevent breakage of said fiber means under conditions of stress on said fiber means, said outer-protective body comprising a preformed member having a generally H-shape cross-section of two upright arms and a cross member therebetween, together defining said preformed recess for receiving and supporting said rigid inner protective body, said uniting material being an injection molded mass formed about said H-shape preformed member and said internal protective body.

13. A method of forming an optical fiber unit comprising the steps of:

providing an optical fiber means configured to provide an optical function, placing about said optical fiber means a preformed hollow internal protective body of material of hardness and thermal expansion substantially matched to that of said fibers, said internal protective body having a preformed space of limited length into which said optical fiber means extends with a relatively close fit, bonding said optical fiber means to said internal protective body, assembling about said internal protective body and optical fiber means an outer protective body comprising two preformed injection-molded segments of substance less rigid and brittle than said internal protective body, said segments defining a preformed recess to receive and support said rigid internal protective body, bonding the segments of said outer protective body about said internal protective body and optical fiber means, and injecting a mass of relatively soft uniting material into said recess in a manner to join spaced-apart portions of the internal protective body to associated portions of the recess-defining outer protective body, a portion of the internal protective body extending within said recess, between masses of uniting material, said portion being free of force-transmitting contact with surrounding recess-defining surfaces of said outer protective body.

14. The method of claim 13 wherein said optical fiber means comprises optical fiber portions extending in opposite directions from a region configured to provide said optical function, wherein said optical fiber portions are gripped by tooling during the making of said optical fiber means, and said portions are continued to be held for support by said tooling during the remainder of said steps of claim 12.

15. The method of claim 13 or 14 comprising the further step of monitoring the optical function of said associated optical fibers during formation of the optical fiber unit.

16. The method of claim 14 wherein said optical fiber means is a coupler and said tooling is used during the steps of heating and drawing said fibers to form said coupler.

* * * * *

UNITED STATES PATENT AND TRADEMARK OFFICE
CERTIFICATE OF CORRECTION

PATENT NO. : 4,714,316
DATED : December 22, 1987
INVENTOR(S) : Wayne E. Moore

It is certified that error appears in the above-identified patent and that said Letters Patent are hereby corrected as shown below:

Column 5, claim 1, line 51, "performed" should be --preformed--;

Column 5, claim 1, line 62, after "body", insert the following:
--enabling the fiber means to extend from said internal protective body--.

Column 6, claim 4, line 49, "means" is misspelled.

Signed and Sealed this

Thirty-first Day of May, 1988

*Attest:*

DONALD J. QUIGG

*Attesting Officer*    *Commissioner of Patents and Trademarks*